United States Patent
Watanabe

(10) Patent No.: US 6,776,338 B2
(45) Date of Patent: Aug. 17, 2004

(54) IC CARD READER

(75) Inventor: Nozomi Watanabe, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/308,812

(22) Filed: Dec. 3, 2002

(65) Prior Publication Data

US 2003/0102375 A1 Jun. 5, 2003

(30) Foreign Application Priority Data

Dec. 4, 2001 (JP) ........................................ 2001-370553

(51) Int. Cl.[7] ............................................... G06K 7/06
(52) U.S. Cl. ........................ 235/441; 235/475; 235/492
(58) Field of Search ............................. 235/451, 379, 235/380, 441, 475, 492

(56) References Cited

U.S. PATENT DOCUMENTS

| | | | | |
|---|---|---|---|---|
| 5,045,674 A | * | 9/1991 | Mita et al. | 235/439 |
| 5,196,687 A | * | 3/1993 | Sugino et al. | 235/483 |
| 5,984,179 A | * | 11/1999 | May | 235/379 |
| 6,138,916 A | * | 10/2000 | Zolkos et al. | 235/475 |

FOREIGN PATENT DOCUMENTS

| JP | 9-147064 | 6/1997 |
|---|---|---|
| JP | 10-027220 | 1/1998 |

OTHER PUBLICATIONS

Ishikawa et al. U.S. PG Pub 2002/0084326.*

* cited by examiner

*Primary Examiner*—Daniel A. Hess
(74) *Attorney, Agent, or Firm*—Reed Smith LLP

(57) ABSTRACT

An IC card reader comprises a card transport path for passing an IC card, an abutting portion and an IC contact, which contacts a contact terminal pattern of the IC card and is capable of coming close to or being distanced from the IC card. The IC card reader further comprises a card discharge port, which is provided at the rear end of said card transport path, regulation means for regulating a distance between said IC contact block and the card transport path, a driving portion for releasing control of the distance and a stopper for aligning the IC contact block to the card transport path. When the IC card left on the card transport path needs to be discharged from the card discharge port, control of the regulation means is released so that the abutting portion and the IC contact are distanced from the card transport path at least to a position such that the IC card cannot contact thereagainst.

5 Claims, 2 Drawing Sheets

Exterior of ← | → Interior of
a card reader      a card reader

Card intake motion

IC CARD READER

CROSS-REFERENCE TO RELATED APPLICATIONS

This application claims priority of Japanese Application No. 2001-370553, filed Dec. 4, 2001, the complete disclosure of which is hereby incorporated by reference.

BACKGROUND OF THE INVENTION a) Field of the Invention

The present invention relates to an IC card reader. More specifically, the present invention provides an improved IC card reader in which the tip of an IC card is pushed against an IC contact block so that the IC contact block moves to cause the IC contact of the IC contact block to touch the contact terminal pattern of the IC card to read and write data onto the IC card.

b) Description of the Related Art

Conventionally, a popularly available IC card reader has a structure in which its IC contact block is lowered to let the IC contact block touch the IC contact terminal pattern utilizing the transporting force of the IC card. In one of the examples of an IC card reader, the tip of the IC card touches the IC contact block moving the IC contact block together with the IC card.

In another example, an IC card reader comprises a card discharge port for discharging the IC card such that the IC card is discharged into a card reservoir, for example, provided in the rear end of the card reader (this type of card discharging operation is referred to as "rear discharge" hereinafter) when a transaction is canceled after the IC card is inserted into the slot or the card is stuck and cannot manually be collected.

The IC card reader illustrated in FIG. 4 of Japanese Laid-open patent (Kokai) publication No. H09-147064, for example, comprises: driving rollers 102a–102d, which transfer IC card 101 and contact head 105: the tip of IC card 101 being transferred by driving rollers 102a–102d touching contact portion 103 of contact head 105 such that the IC card 101 transport motion also moves (pushes) contact portion 103 of contact head 105. In the middle of transportation of IC card 101, contact shoe 104 electrically contacts the terminal of IC card 101 thereby letting IC card 101 communicate with the card reader. As IC card 101 is transported further, contact portion 103 is removed from the tip of IC card 101 so that IC card 101 can pass through, when contact head 105 returns to its original position. In the IC card reader, contact shoe 104 of contact head 105 is capable of contacting and separating from the terminal of IC card 101. Reference symbol 106 denotes arms that support contact head 105.

The IC card reader disclosed in Japanese Laid-open patent (Kokai) publication No. H10-27220 comprises, as illustrated in FIG. 5, hook 204 for accurately aligning contact 202 on IC card 201 and contact 203 on the card reader side in a manner that it would not prevent movement of IC card 201. Hook 204 stands up during alignment such that the edge of IC card 201 contacts thereagainst and is stored in contact holder 205 at the time of in-take motion of IC card 201.

PROBLEMS ADDRESSED BY THE INVENTION

Nonetheless, in these IC card readers, accuracy of alignment deviates when IC contact block (contact portion 103 and contact holder 205) is held at a contact point where data on IC card 201 is read out or written. This may cause inconsistency in contact pressure and adversely affect accuracy of reading or writing data from/to the IC card. In addition, when contact holder 205 is used, contact 202 may slide along IC card 201 at the time of rear discharge motion, thereby damaging contact 201.

In contrast, when a stopper is provided for aligning the IC contact blocks (103 and 205), the IC contact block is structured to provide alignment thereof. As a result, the IC contact block becomes stationary thereon once alignment is done. At this stage, the registration plate gets into the card transport path, making the rear discharge of IC card 101 or 201 impossible.

OBJECT OF THE INVENTION

To overcome the drawback, the present invention provides an IC card reader, which is capable of accurately aligning an IC contact block at a contact point without damaging the IC contact and allowing the rear discharge of an IC card.

SUMMARY OF THIS INVENTION

An IC card reader comprising: a card transport path for passing an IC card; an abutting portion; and an IC contact, which contacts a contact terminal pattern of the IC card and is capable of coming close to or being distanced from the IC card. The IC card reader further comprises: a card discharge port, which is provided at the rear end of the card transport path than the IC contact block; regulation means for regulating the distance between the IC contact block and the card transport path; driving means for releasing control of the distance; and a stopper for aligning the IC contact block which has come close to the card transport path. When the IC card left on the card transport path needs to be discharged from the card discharge port, control of the regulation means is released such that the abutting portion and IC contact are removed from the card transport path at least to the position where the IC card cannot contact thereagainst.

In this card reader, regulation means regulates the distance between the IC contact block and the card transport path unless the IC card needs to be discharged from the rear end of the card reader. The abutting portion projecting from the IC contact block in this case is always located within (stands on) the card transport path. As a result, the tip of the card strikes the abutting portion during transport motion along the card transport path, which causes the IC contact block to move toward the IC card, thereby letting the IC contact touch the contact terminal pattern. Here, the IC contact block takes advantage of a stopper and stops at a given position, which stops the IC card by touching the abutting portion at a given position. The contact between the IC contact and the contact terminal pattern is thus stabilized, providing consistency to reading and writing of data onto the IC card. Accuracy of reading and writing of data from/onto the IC card is thus improved.

When one wants to rear discharge an IC card that was taken into a card reader, one activates a drive means to cancel control of the regulation means. Hence, the IC contact block can be kept away from the card transport path only for the distance (height) that was put on. Hence it is possible to keep the abutting portion and the IC contact off the card transport path. The IC card, the subject of the rear discharge, can thus be discharged from the rear end of the card reader without being interrupted by the abutting portion.

It is desirable that one adopts driving means that can instantly cancel control of the regulation means, for example, a solenoid for the IC card reader of the present invention.

DESCRIPTION OF THE PREFERRED EMBODIMENTS

Figure 1:
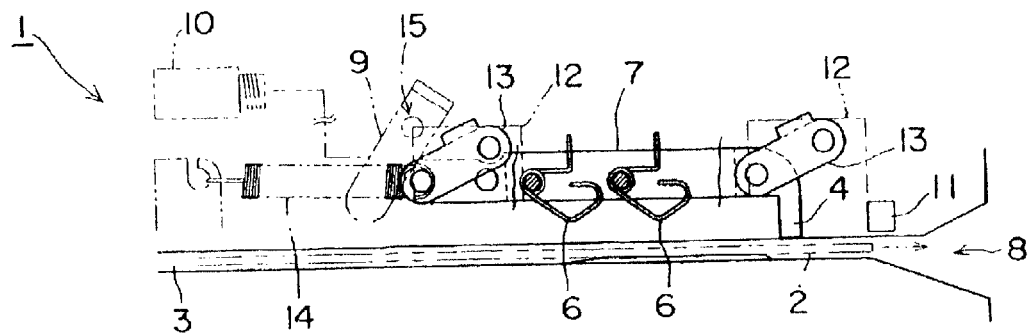
FIG. 1 is a schematic diagram illustrating the internal structure of an IC card reader of one of the embodiments of the present invention in the removed state.

The configuration of the present invention is described herein with reference to an embodiment illustrated in the drawings.

Figure 2:
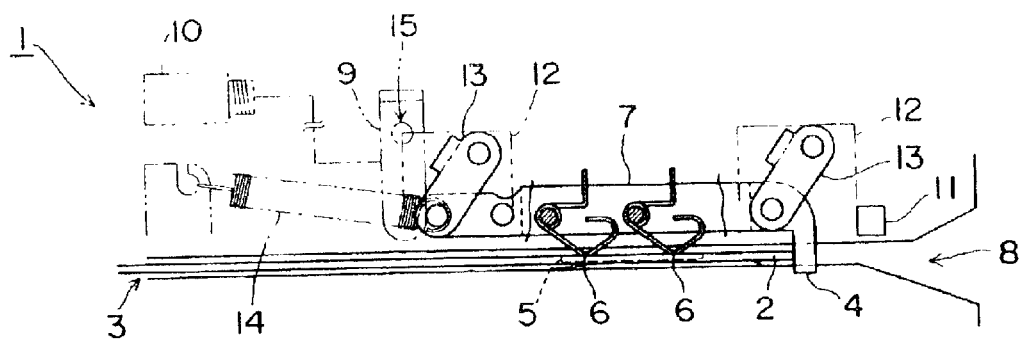
FIG. 2 is a schematic diagram illustrating the internal structure of an IC card reader of one of the embodiments of the present invention when a card is being inserted therein.
Figure 3:
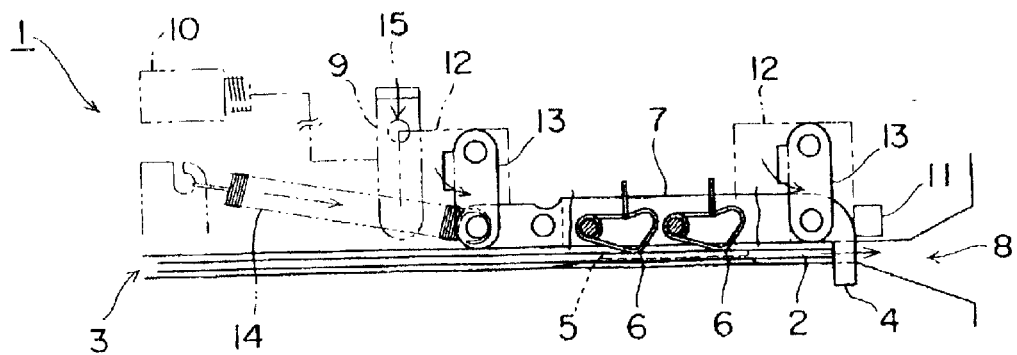
FIG. 3 is a schematic diagram illustrating the internal structure of an IC card reader of one of the embodiments of the present invention when data is read or written onto the IC card.
Figure 4:
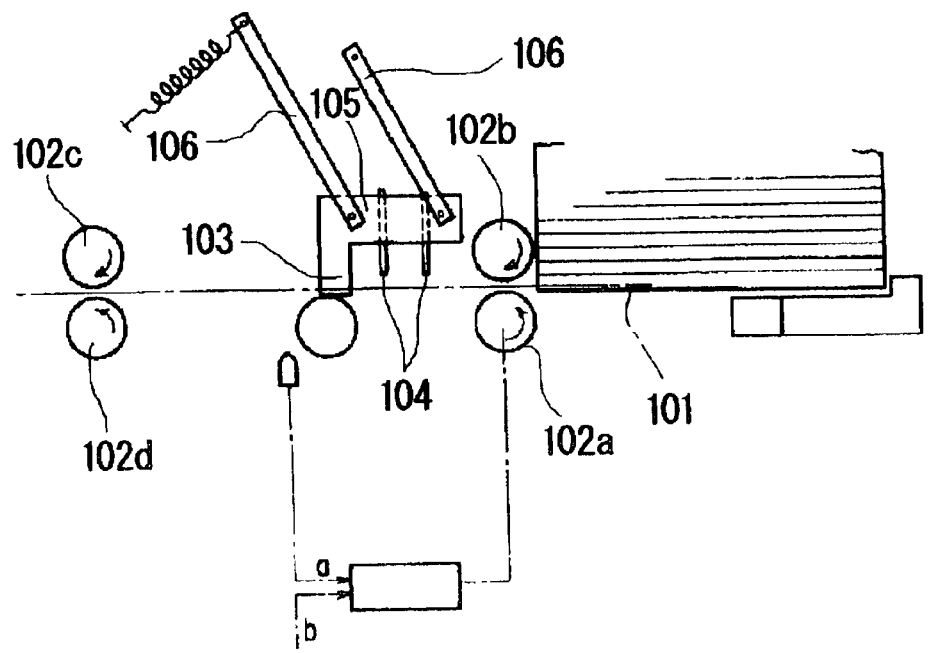
FIG. 4 is a schematic diagram illustrating the structure of an IC card reader of conventional technology.
Figure 5:
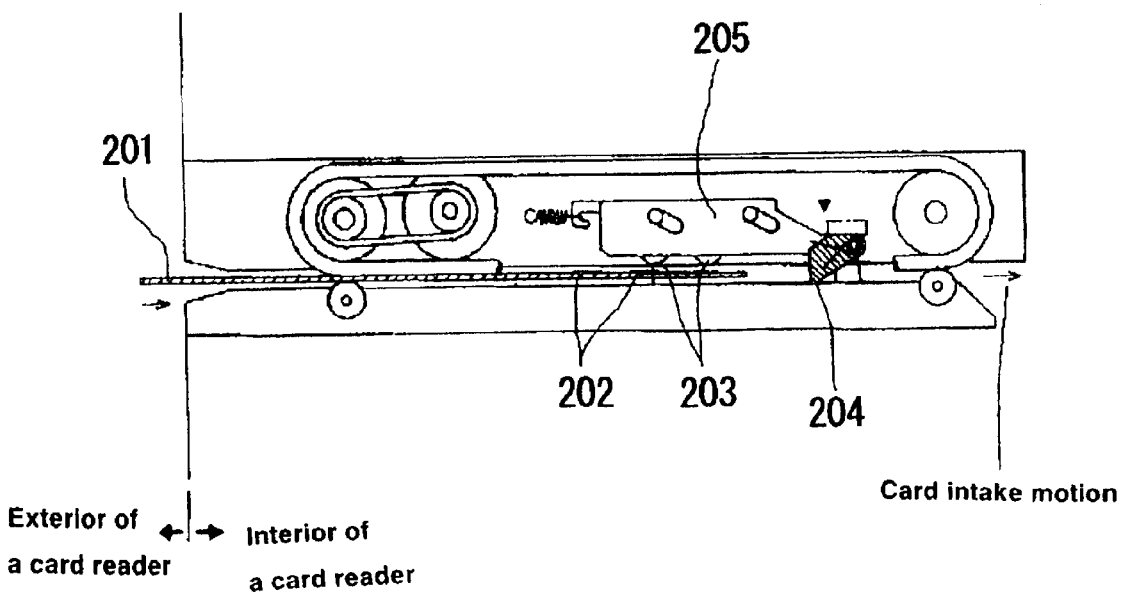
FIG. 5 is a schematic diagram illustrating the structure of an IC card reader of conventional technology.

FIGS. 1–3 illustrate an embodiment of the present invention. IC card reader 1 of the present invention comprises: card transport path 3 along which IC card 2 is transported and IC contact block 7 which is capable of coming close to and being distanced from IC card 2 on card transport path 3. Regarding the direction of IC card 2 transport movement, this specification defines the left side in the figures where a card insertion slot (not illustrated) is located as the "fore" while the side where card discharge port 8 is located as the "rear".

IC contact block 7 having an abutting portion 4 and IC contact 6 is a movable member and comes close to IC card 2 such that contact terminal pattern 5 on IC card 2 electrically contacts or touches IC contact 6 to read or write data onto IC card 2. IC contact 6 is constructed with a contact spring, as illustrated in FIG. 1 for example, and is arranged such that it contacts a given point on contact terminal pattern 5 of IC card 2 at a contact position.

IC contact block 7 is supported in such a way that it is hooked up to a plurality of, for example, four arms 13 rotatably attached to frame 12. IC contact block 7 is, therefore, movable in the card transport direction and comes close to or is distanced from card transport path 3 according to card transport movement. In addition, in the rear end of IC contact block 7, abutting portion 4 is provided in a manner that projects into card transport path 3. Abutting portion 4 projects into card transport path 3, as IC contact block 7 comes close to IC card 2 as shown in FIG. 2 such that it can contact card transport path 3. Moreover, force transmission means 14 constructed with a coil spring, for example, applies force to IC contact block 7 toward the fore.

Regulation means 9 is a stopper, which regulates the distance between IC contact block 7 and card transport path 3, and comprises arms that vary the degree of slope (angle) around pivot 15 in this embodiment.

Also, driving means 10 made of a solenoid incrementally varies the slope of regulation means 9. Taking an example in this embodiment, normally (when there is no need for rear discharge of IC card 2 nor reading/writing from/to IC card 2, and transport of IC card 2 is performed normally), regulation means 9 is kept about perpendicular to IC card 2 such that the movement of IC contact block 7 toward the fore is limited to a given distance. When IC contact block 7 can be distanced from the card transport path only by a very limited degree as in this case, even though IC contact block 7 sets off from card transport path 3 at a maximum degree (FIG. 2), abutting portion 4 cannot be removed from card transport path 3. However, regulation means 9 tilts to the release point illustrated in FIG. 1 at the time of rear discharge of IC card 2. In this state, IC contact block 7 is free from (distance) control. As a result, abutting portion 4 and IC contact 6 can be moved to the point that is remote from card transport path 3 (FIG. 1).

Driving means 10 is made of a solenoid, for example. Driving means 10 made up of a solenoid is desirable in view of its capability to instantly cancel control of regulation means 9. However, this invention is not limited to this and an alternate means such as a motor may also be used.

Card discharge port 8 is provided more toward the rear end of card transport path 3 than IC contact block 7. Card discharge port 8 has a slanted surface on which IC card 2 can slide downward from card transport path 3 as illustrated in FIGS. 1, 2, and 3 to guide IC card 2 to a card reservoir (not illustrated) located further toward the rear end. In the IC card reader 1 of this embodiment, IC card 2 stuck in card transport path 3 is discharged from the rear end to the card reservoir through card discharge port 8.

Stopper 11 is provided in such a way that it aligns IC contact block 7 moving toward the rear end at a given contact point where an appropriate contact must be maintained between IC contact 6 and contact terminal pattern 5. In this embodiment, stopper 11 that contacts against IC contact block 7 is provided. However, a stopper that contacts arm 13 to stop the motion of IC contact block 7 may also provide similar alignment for IC contact block 7 and IC card 2.

The operation of the IC card reader 1 of the above embodiment is described herein.

Under normal conditions, regulation means 9 is kept at a regulation position by driving means 10 so as to control distances of IC contact block 7. Here, IC contact block 7, receiving a force from force transmission means 14 toward the fore, moves the longest distance under control and is held at a point where its front end contacts regulation means 9. At this stage, abutting portion 4 projects into card transport path 3.

Now as IC card 2 is transported through card transport path 3 and its tip contacts abutting portion 4, IC card pushes contact block 7 toward the rear end, and at the same time, contact block 7 heads down toward IC card 2, causing IC contact 6 to touch contact terminal pattern 5 on IC card 2. In addition, IC contact block 7 touches stopper 11 and is aligned therewith. IC contact 6 touches contact terminal pattern 5 thereby maintaining their electrical connection.

As reading or writing of data onto the IC card is finished, IC card 2 is manually or automatically returned to a slot by a transfer means such as rollers (not illustrated). At this time, force transmission means 14 automatically moves (bounces) IC contact block 7 back to the point marked in FIG. 2.

When IC card needs to be collected inside of IC card reader 1 for reasons such as IC card is disposed and the like, driving means 10 tilts regulation means 9 to release control of the distance between IC contact block 7 and the card transport path (FIG. 1). Releasing the distance control diminishes the distance between IC contact block 7 and the card transfer path 3, thus moving (pulling) IC contact block 7 more toward regulation means 9 and removes abutting portion 4 and IC contact 6 from card transport path 3. IC card 2 that is now a subject of rear discharge is thus discharged to a card reservoir through card discharge port 8.

The above embodiment is a desirable mode of reduction to practice of the present invention. However, the present invention is not limited to this. It can be modified in many ways as long as the spirit of the present invention remains the same. For example, regulation means 9 of the type that can vary the degree of slant around pivot 15 was adopted in the embodiment. However, this is only one of the desirable embodiments and any regulation means can be applied to the present invention as long as it regulates the distance between IC contact block 7 and card transfer path 3. For example, regulation means 9, that provides parallel motion to change its position between the regulation point and release point, may also be applied to the present invention.

As is apparent from what is described above, according to the IC card reader of the present invention, the simple configuration in which an IC contact block is removed from the card transport path allows collection of an IC card from the rear end without damaging an IC contact. In addition, the abutting portion mechanism preserves its ability to accurately align the IC contact block. The accurate alignment of the contact point required for reading/writing of data from/to an IC card is thus made possible.

According to the IC card reader of this invention, regulation of the amount of deviation can instantly be released.

While the foregoing description and drawings represent the present invention, it will be obvious to those skilled in the art that various changes may be made therein without departing from the true spirit and scope of the present invention.'

What is claimed is:

1. An IC card reader comprising:
    a card transport path for passing an IC card;
    an abutting portion structured to project into the card transport path during IC card insertion and structured to contact the IC card during insertion;
    an IC contact, which contacts a contact terminal pattern of said IC card and is capable of coming close to or being distanced from said IC card;
    said IC card reader further comprising:
        a card discharge port, which is provided at the rear end of said card transport path;
        regulation means for regulating a distance between said IC contact block and said card transport path;
        driving means for releasing control of said distance; and
        a stopper for aligning said IC contact block to said card transport path;
    wherein when said IC card left on said card transport path needs to be discharged from said card discharge port, control of said regulation means is released, so that said abutting portion and said IC contact are distanced from said card transport path at least to a position such that said IC card cannot contact thereagainst.

2. The IC card reader as set forth in claim 1, wherein said driving means is a solenoid.

3. The IC card reader as set forth in claim 1, wherein the IC contact is a resilient contact spring.

4. An IC card reader for use with an IC card comprising:
    a card transport path for passing the IC card, said transport path having a front section and a rear section;
    a card discharge port which is provided at the rear section of said card transport path;
    a moveable IC contact block with an abutting portion located near the rear section, said abutting portion structured to project into the card transport path during IC card insertion so that said abutting portion contacts a leading edge of the IC card near the rear section during insertion on the IC card;
    a moveable stopper connected to the contact block, and moveable via a driving unit, wherein said moveable stopper is structured for aligning said moveable IC contact block to the IC card after the IC card contacts the abutting portion; said stopper also being structured to obtain a set distance between said IC contact block and the IC card;
    at least one IC contact located on said contact block and structured as a resilient spring contact so that said IC contact contacts a terminal pattern on the IC card;
    wherein the moveable stopper is structured so that if the IC card needs to be discharged from said card discharge port, the abutting portion is raised above said card pathway by moving the moveable stopper, and said IC contact is thereby distanced from said card transport path at least to a position such that said IC card cannot be contacted or damaged before or during discharge from the rear section.

5. An IC card reader for use with an IC card as in claim 4 wherein:
    the moveable stopper is structured so that if the IC card needs to be discharged from said card discharge port, the abutting portion is raised above said card pathway by moving the moveable stopper, and said IC contact is thereby distanced from said card transport path at least to a position such that said IC card cannot be contacted or damaged before or during discharge from the rear section by having the contact block move towards the front section thereby also moving the IC card towards the front section to disengage the IC card from the resilient IC contacts without causing damage to the IC card.

* * * * *